(12) United States Patent
Battisti et al.

(10) Patent No.: US 8,487,205 B2
(45) Date of Patent: Jul. 16, 2013

(54) WELDING HEAD RAIL SQUARING PROCESS

(75) Inventors: Charles R. Battisti, Gladstone, MO (US); Gary Barnhart, Roeland Park, KS (US)

(73) Assignee: Chemetron Railway Products, Inc., Albertville, AL (US)

( * ) Notice: Subject to any disclaimer, the term of this patent is extended or adjusted under 35 U.S.C. 154(b) by 1357 days.

(21) Appl. No.: 12/200,575

(22) Filed: Aug. 28, 2008

(65) Prior Publication Data
US 2010/0051585 A1  Mar. 4, 2010

(51) Int. Cl.
*B23K 11/00* (2006.01)
*B23K 9/007* (2006.01)
*B23K 1/00* (2006.01)
*B23K 37/02* (2006.01)
*B23K 9/00* (2006.01)
*B23K 9/02* (2006.01)

(52) U.S. Cl.
USPC .............. 219/55; 219/54; 219/57; 219/86.51; 219/100; 219/101

(58) Field of Classification Search
USPC .................. 219/55, 57, 86.51, 100, 101, 104, 219/61.2, 112; 228/44.3
See application file for complete search history.

(56) References Cited

U.S. PATENT DOCUMENTS

| | | | | |
|---|---|---|---|---|
| 804,763 A * | 11/1905 | Pahde | | 219/55 |
| 950,716 A * | 3/1910 | Cadle | | 219/55 |
| 1,264,611 A * | 4/1918 | Cleveland | | 219/55 |
| 4,272,664 A * | 6/1981 | Theurer | | 219/53 |
| 4,300,031 A * | 11/1981 | Reboux et al. | | 219/617 |
| 4,352,972 A * | 10/1982 | Lebedev et al. | | 219/100 |
| 5,270,514 A * | 12/1993 | Wechselberger et al. | | 219/100 |
| 5,763,850 A * | 6/1998 | Hardt | | 219/104 |
| 5,880,425 A * | 3/1999 | Carnes et al. | | 219/112 |
| 6,163,003 A * | 12/2000 | Battisti | | 219/55 |
| 6,180,910 B1 * | 1/2001 | Derby, Jr. | | 219/86.51 |
| 6,294,752 B1 * | 9/2001 | Kuchuk-Yatsenko et al. | | 219/100 |
| 2002/0153354 A1 * | 10/2002 | Norby et al. | | 219/55 |

* cited by examiner

*Primary Examiner* — Joseph M Pelham
*Assistant Examiner* — Gyounghyun Bae
(74) *Attorney, Agent, or Firm* — Leydig, Voit & Mayer

(57) ABSTRACT

An improved method for executing a flash butt weld to join first and second rail segments includes applying a voltage to the first rail segment and the second rail segment to establish a voltage difference between the first and second rail segments. The rail end faces are brought into contact, resulting in an electrical current between the first rail end face and the second rail end face, resistively heating material at the interface. As material burns off at the interface, the power consumed at the rail end interface as a function of rail displacement is periodically sampled. If the comparison indicates that the power per unit of rail displacement is not increasing from sample to sample, the burn-off process is terminated. In a further aspect, if the power per unit of rail displacement exceeds a predetermined threshold, the burn-off process is terminated.

10 Claims, 6 Drawing Sheets

WELDING HEAD RAIL SQUARING PROCESS

TECHNICAL FIELD

This disclosure relates generally to systems and methods for flash butt welding of railway rails and, more particularly, to an in-track DC welding system for executing flash butt welding of non-square rail ends.

BACKGROUND

Resistance welding of railroad rails is often used to join two rail sections together as a railway is built or repaired. This type of welding is commonly referred to as "flash butt welding." During flash butt welding, the two rails ends to be joined are first heated and then forged together, expelling liquid metal and oxides from the weld joint. The forged joint is sheared to remove the flash, which is solidified material that was forced out of the joint during forging.

A typical flash butt weld requires cleaning the rail ends by flashing off oxides and impurities, followed by forging the rail ends together. The flashing step involves bringing the rail ends into contact and resistively heating and removing the protrusions that come into contact, so that the end result, prior to forging, is a set of rail end faces that are macroscopically planar and parallel to one another, and whose planes are substantially perpendicular to the track axis within some acceptable degree of variance. In this way, the resulting forge joint may be made uniform and strong across the entire rail cross-section.

However, in practice, when rail ends are cut to the appropriate length, the rail end face may be nonperpendicular to the rail axis and, more importantly, may be nonparallel to the mating rail end face. Thus, the flashing step also needs to be preceded by a "burn-off" step to remove sufficient material from one or both faces so as to render the mating faces mutually parallel. In such cases, it is important for the operator to ensure that a sufficient amount of material is removed without allowing excess burn-off and rail truncation. Traditionally, the burn-off has been difficult to perform with precision, and thus, the squaring of rail ends has either taken excessive operator supervision, with the attendant risks of human error, or has been neglected entirely.

When considering this background section, the disclosure and claims herein should not be limited by the deficiencies of the prior art. In other words, the solution of those deficiencies, while desirable, is not a critical limitation of any claim except where otherwise expressly noted in that claim. Moreover, while this background section is presented as a convenience to the reader who may not be of skill in this art, it will be appreciated that this section is too brief to attempt to accurately and completely survey the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY

In one aspect, a method for preparing for a flash butt weld between a first rail segment and a second rail segment is disclosed. In this aspect a closing force is applied to such that a first rail end face of the first rail segment and a second rail end face of the second rail segment come into contact, a voltage difference between the rail segments then causing an electrical current to flow between the first rail end face and the second rail end face. The current is sufficient to burn off material at one or more points of contact between the first rail end face and the second rail end face. As the rail segments are forced together, a characteristic of the electrical current flow between the first rail segment and the second rail segment is periodically sampled and compared to a previous sample if any. If the comparison indicates that the characteristic is not changing monotonically, or if the characteristic has a reached or passed a predetermined threshold, the burn-off process is terminated.

In another aspect, an improved in-track weld system for preparing for forge welding of rail segments is provided, including an in-track welding energizing system for supplying welding voltage and current, as well as a controller for executing a burn-off procedure prior to a welding operation. In the burn-off procedure, the controller forces the two rail segments together at an interface while applying a voltage difference across the interface to cause burn-off of material at the interface. The controller periodically samples the power consumed at the interface as a function of a relative displacement of the rail segments, and terminates the burn-off procedure when the power consumed at the interface is not increasing or exceeds a predetermined threshold.

In yet another aspect, a computer-readable medium is provided for preparing for a flash butt weld to join a first rail segment to a second rail segment. The computer-readable medium includes computer-executable instructions for applying a current and voltage source to the rail segments to establish a voltage difference between the rail segments, as well as instructions for applying a closing force such that the first rail end face and the second rail end face come into contact. As the faces come into contact, an electrical current sufficient to burn off material between the rail end faces begins to flow. The computer-readable medium further includes instructions for continuing to force the rail segments together while periodically sampling the power used per unit of rail displacement, and comparing the sampled power to a previously sampled power if any. If the comparison indicates that the power has reached or exceeded a predetermined threshold, the burn-off process is terminated.

Other aspects and advantages of the disclosed principles will be appreciated from the following description, taken in conjunction with the accompanying drawings.

DETAILED DESCRIPTION

Before describing the disclosed implementations in detail, a brief description of the rail welding environment will be undertaken to aid the reader. Railroad tracks are generally constructed of rail segments that are cut to an appropriate length via manually operated equipment and welded together. The cut rail ends are frequently slightly nonperpendicular in one or more dimensions relative to the rail axis (this condition is referred to herein as "nonsquare"). More importantly, since nonsquare errors are arbitrary in nature, the nonsquare rail end will also be non-parallel to the potential mating rail end face in most such cases, even if the mating end has been cut perfectly square. Thus, the mating rail ends must first be squared prior to forging.

The system described herein provides a control system for detecting and correcting the nonsquare condition without user interaction. In this way, the rail ends are optimally square, and are at least mutually parallel, prior to welding. This control system leads to substantial improvements in average weld quality and process efficiency. In particular, the vagaries of user interaction are avoided, ensuring higher weld quality, while preventing excess rail segment truncation, thus maintaining appropriate scheduled track temperature dependence.

Figure 1:
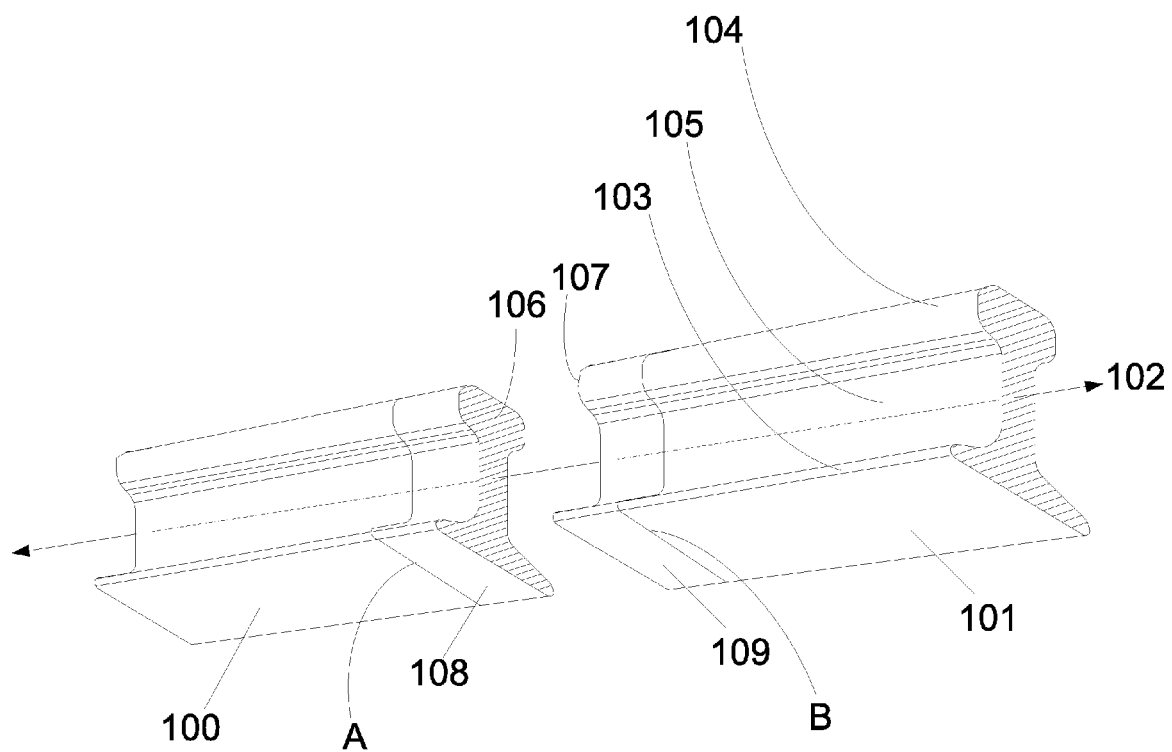
FIG. 1 is a perspective view of two rail segments in position for flash butt welding in accordance with the disclosed principles.

Turning to the specifics of rail welding, FIG. 1 is a perspective view of two rail segments in position for flash butt welding in accordance with the disclosure. In particular, a first rail segment 100 and a second rail segment 101 are shown aligned with one another along the longitudinal rail axis 102 with a slight space between the first rail segment 100 and the second rail segment 101. Each of the first rail segment 100 and the second rail segment 101 include a rail base section 103 as well as a rail head section 104. The rail base section 103 and the rail head section 104 are interconnected via a rail web section 105. The rail base section 103 and the rail web section 105 provide strength to the rail generally and also provide surface area for joints between rail segments such as between the first rail segment 100 and the second rail segment 101. The rail head section 104 provides additional strength to the rail and provides additional surface area for joining, but also provides a support plane upon which rail wheels will run when the railway is completed.

It is often necessary to perform in-track joining of rail segments. For example, large rail segments created during in-plant welding may be transported to a railway location and joined in series to create a finished railway. Moreover, individual rail segments may be joined at the railway location in combination with or instead of longer pre-welded segments. Finally, in-track welding is also used to repair or modify existing railways. In-track welding is welding that is performed at the railway site, often by a machine that rides on the rails. Such a machine may be a rail-only machine, but is more typically a machine adapted to ride on both roadways and railways via the use of two different wheel sets.

In-track welding in accordance with the disclosed structure is performed via resistive heating of rail ends to allow the ends to be forged together under force. In the illustration of FIG. 1, the first rail segment 100 has a first rail end 106, and the second rail segment 101 has a second rail end 107 (obscured in perspective view by second rail segment 101). During in-track welding, a region at the end of each rail of interest is heated. In the illustrated example, a first region 108 adjacent first rail end 106, delineated by line A, is heated, as is a second region 109 adjacent second rail end 107, delineated by line B. The longitudinal extent of the first region 108 and the second region 109 are exaggerated in FIG. 1 for clarity.

Figure 2:
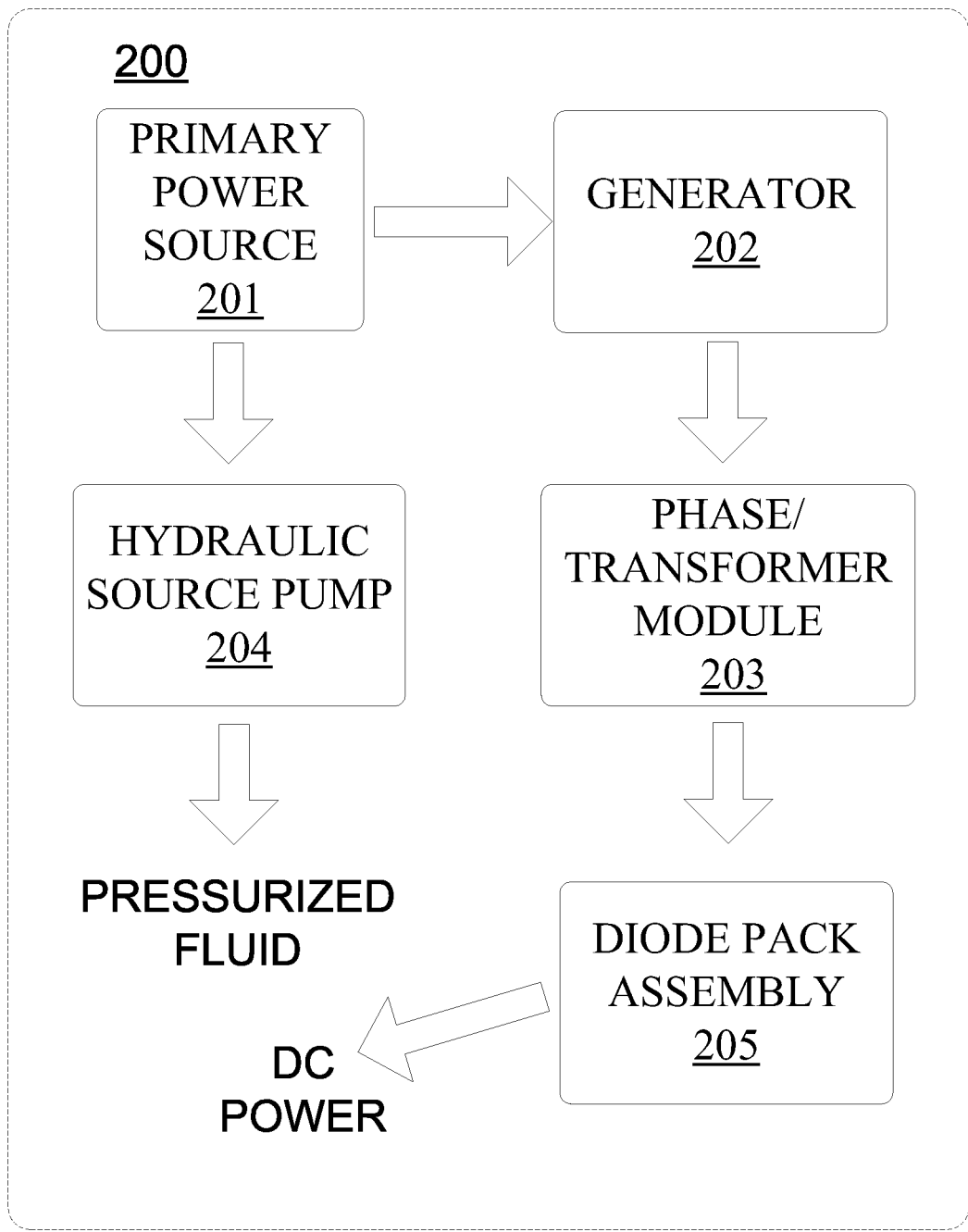
FIG. 2 is a schematic system diagram of an in-track welding system within which the presently disclosed method of flat butt welding may be implemented.

Prior to discussing the particular process control system disclosed herein, the welding procedure will be briefly discussed to aid the reader's later understanding. In conjunction with this discussion, reference is made to FIG. 2, which shows a schematic view of an in-track welding energizing system 200 in accordance with the disclosure. The in-track welding energizing system 200 comprises electrical energy generation and transformation elements. In particular, the in-track welding energizing system 200 includes a primary power source 201, e.g., an internal combustion engine. The primary power source 201 is typically a dedicated power source, i.e., it is not used for transportation but only for the in-track welding energizing system 200. However, in an alternative embodiment, the primary power source 201 may also be used for functions outside of the in-track welding energizing system 200.

The primary power source 201 provides rotational energy to drive a generator 202. When thus driven, the generator 202 provides an alternating current (AC) electrical power output consistent with its construction. For example, in an embodiment, the generator 202 provides a 3-phase high-voltage (480V) AC output. The AC output of the generator 202 is first processed by a phase/transformer module 203, e.g., a silicon controlled rectifier (SCR) bridge comprising SCRs and diodes, into a single phase high voltage (e.g., 550V) high frequency (e.g., 1200 Hz) AC output. The primary power source 201 may also drive a hydraulic source pump 204 to provide pressurized hydraulic fluid to the system. The pressurized hydraulic fluid is used for the operations that require motion, such as moving the rails and shearing the weld joint.

The AC output of the phase/transformer module 203 is provided to and processed by a diode pack assembly 205. The diode pack assembly 205 comprises a transformer to step down the voltage of the input, as well as one or more rectifying circuit elements such as diodes to transform the signal from AC to DC. After this transformation, the output of the diode pack assembly 205 is a low voltage DC power signal. In an embodiment, the output of the diode pack assembly 205 has an open-circuit voltage between about 5 and about 12 volts, e.g., 8 volts. The current output by the diode pack assembly 205 may be as high as approximately 30,000 amps or higher.

During an in-track weld, the DC output of the diode pack assembly 205 is applied to a junction between rail segments, e.g., first rail segment 100 and second rail segment 101. At the initiation of a weld cycle, the rail ends of interest are brought together until they touch, as determined by the presence of a weld current draw. After contact, an amount of material, e.g., 0.25 inches, is removed from the two rail ends during what is referred to as a "burn off" stage. This step aids in the elimination of oxidation, grease, and other contaminants between the rail ends, and also serves to square uneven saw cuts so that the rail ends may be heated evenly. The control of this squaring function is central to this disclosure, and will be discussed in greater detail later.

When the low-voltage high-current signal is passed through the rail junction, the primary heating modality is electrical resistance. In particular, when a high electrical current is passed through a conductive material, heat will be developed in the material as a function of the electrical resistance of the material. The primary heating affect will occur at the point or points of greatest resistance, which will be any points of contact between the rail ends. Moreover, as the rail ends heat up, they become more resistive, increasing the spatial nonlinearity of the heating effect. The net result of these phenomena is to concentrate the heating of the rail material strongly as a function of cross-sectional contact area, with large contact patches experiencing lower heating than small contact patches.

Once the ends are square, the process of heating for welding begins in the heat flash stage, referred to as "flashing." During the flashing process, the rail ends are moved toward each other at a slow rate. The welding current is maintained at a level sufficient to melt and vaporize small areas of the rail ends that form contact points. This occurs in many places across the rail face at any given moment, forming a protective shield that prevents oxidation of the hot, reactive rail faces.

After flashing, a progressive flash stage begins. In this stage, an increase in the feed rate causes an increase in the number of contact points being melted and vaporized. The increase in metal vapor causes an increase in the protective shield that helps eliminate oxides from forming on the rail faces. At the same time, flashing crater depth is reduced, leaving less material to be forged away.

After the rail ends have been sufficiently heated and the surface cratering reduced by progressive flashing, the rails are forged at a high feed rate. The welding current may be left energized for some period of time, e.g., 1.5 seconds, after the start of this stage. This helps ensure that the hot rail surfaces are protected from oxidation immediately prior to forging.

Full forging force is applied to the rails for a predetermined period of time, e.g., nine (9) seconds, known as "holding time." The travel of the rails is stopped by the resistance of the heated rail ends, and as such the rail ends are forged together until there is no further plastic deformation. Experience has shown that a forging force of 9000 pounds per square inch exerted on the face of the two rail ends will yield favorable results. Thus, for example, the forging force required for 115# rail may be approximately 51 tons, while the forging force required for larger 141# rail may be about 63 tons.

During forging, oxides and liquid steel are expelled from the weld joint, typically resulting in a three-part weld burr. Two outer portions of the burr are formed by plastic deformation of soft material of the two rails, while a center portion is formed by metal expelled in a liquid state from the center of the weld joint. After the weld is sufficiently firm but while the burr material is still hot, the welding head shears the burr from the weld joint.

Figure 3:
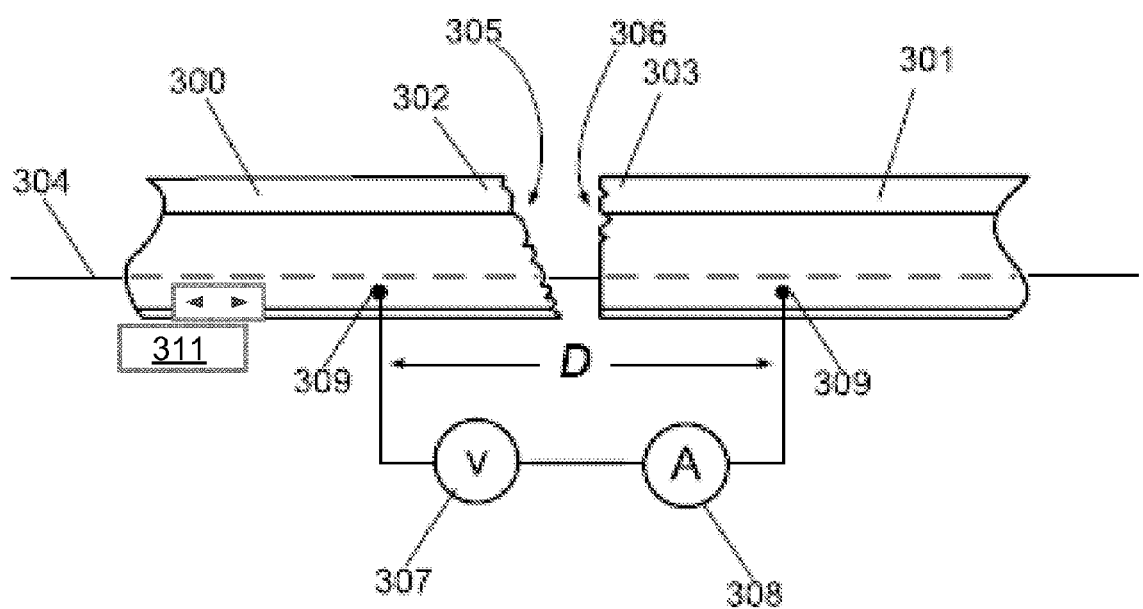
FIG. 3 is a side view of two rail segments having non-flat and mutually nonparallel faces to be flash welded in accordance with the disclosed principles.

With the foregoing overview of the welding process in mind, the following description of the control process may be more easily understood. FIG. 3 is a side view of the view of two rail segments in position for flash butt welding in accordance with the disclosure. In particular, a first rail segment 300 and a second rail segment 301 are shown in an aligned configuration. As shown in FIG. 3, the first rail segment 300 has a first rail end 302, and the second rail segment 301 has a second rail end 303. The first rail end 302 has a rail end face 305 lying in a plane essentially perpendicular to the plane of the drawing, and the second rail end 303 has a rail end face 306 lying in a plane essentially perpendicular to the plane of the drawing. It can be seen that the rail end face 305 of the first rail end 302 is nonsquare relative to the rail axis 304, while the rail end face 306 of the second rail end 303 is essentially square relative to the rail axis 304. The extent of the nonsquare condition has been exaggerated for clarity, as have the surface textures of the rail end faces 305, 306.

Figure 4:
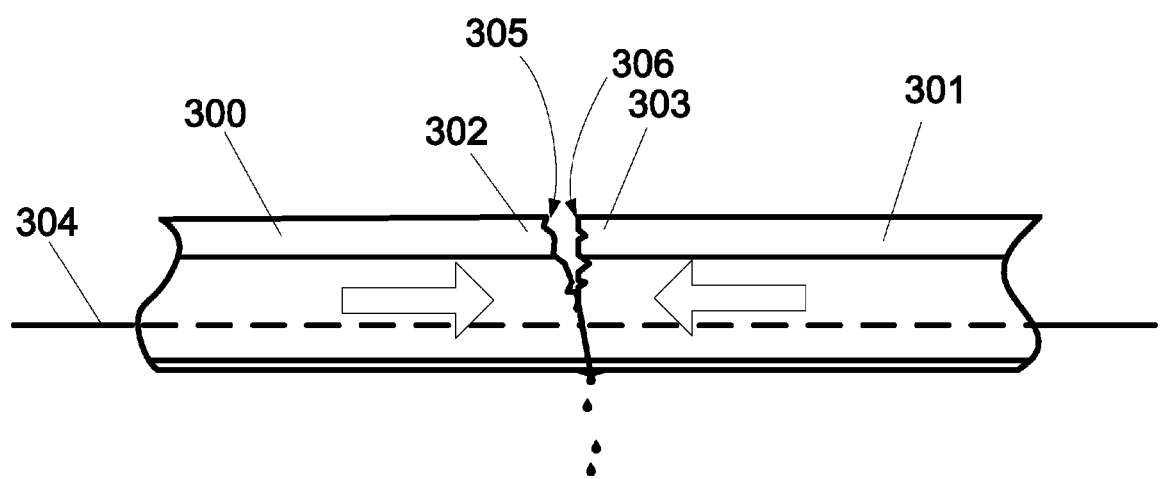
FIG. 4 is a side view of the two rail segments of FIG. 3, wherein the rail ends have been partially burned off in accordance with the disclosed principles.
Figure 5:
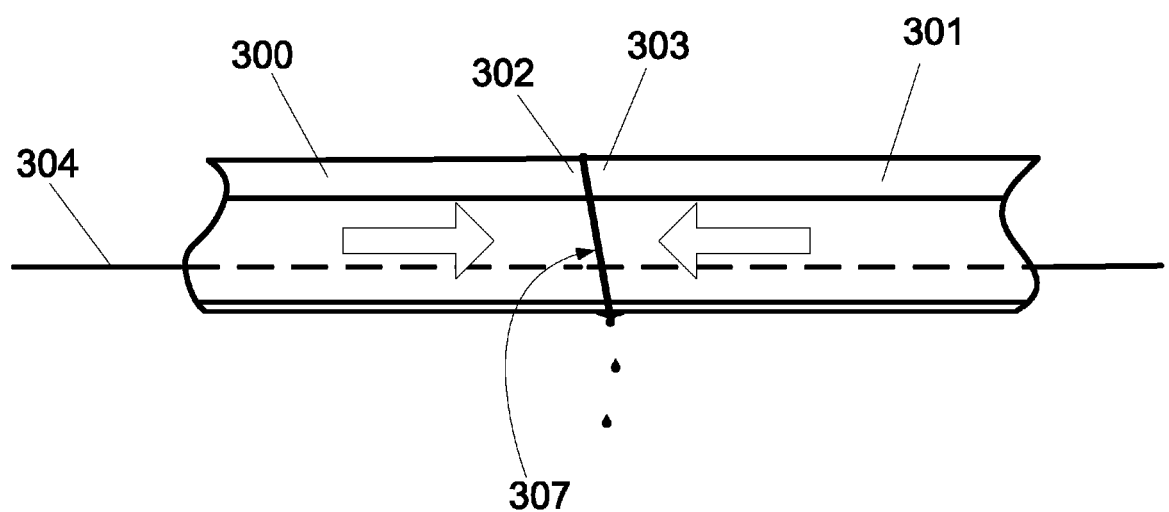
FIG. 5 is a side view of the two rail segments of FIG. 3, wherein the rail ends have been completely burned off in accordance with the disclosed principles to be flat and mutually parallel for welding.

FIG. 4 illustrates the first rail segment 300 and the second rail segment 301 during the burn-off process, while FIG. 5 illustrates the first rail segment 300 and the second rail segment 301 at the end of the burn-off process. These figures will serve as a reference during the discussion of the end-squaring process according to an embodiment of the disclosed principles. FIG. 3 also shows the electrical connection between rail segment 300 and rail segment 301. In particular, a voltage source 307 supplies a voltage differential across the rail segments through one or more contacts 309 on each rail segment. The voltage source 307 in an embodiment is the diode pack assembly 205. It will be appreciated that the voltage source 307 may supply DC voltage or may supply AC voltage, and may include a voltage meter internally or externally to measure the voltage applied by the voltage source 307.

An ammeter 308 in series with the interface provides a reading of the interface current. The ammeter 308 may be external or may be within the diode pack assembly 205 or other component. The electrical connection between rail segment 300 and rail segment 301 has been omitted from FIG. 4 and FIG. 5 for clarity.

In addition to the ammeter 308 and the voltage meter, sometimes referred to as a "volt meter," a displacement sensor 311 may be provided to measure the relative displacement between the rail segment 300 and rail segment 301. Thus, as interfacial material is burned away, the rails, still under closing force, move toward one another as a function of the amount of material lost. The displacement sensor 311 measures this movement and produces a signal indicative of this movement. The displacement sensor 311 may be permanent or removable from the system 200, and may be of any known variety, including contact sensors such as resistance sensors, piezoelectric sensors, mechanical optical sensors, etc., or non-contact sensors such as IR sensors, remote optical sensors, interferometric sensors, etc.

The operations related to the flash butt weld process, e.g., process 600 discussed below, are executed by the machine controller (not shown). A machine controller is or comprises a computing device, e.g., a processor, that reads computer-executable instructions from a computer-readable medium and executes those instructions. Media that are readable by a computer include both tangible and intangible media. Examples of the former include magnetic discs, optical discs, flash memory, RAM, ROM, tapes, cards, etc. Examples of the latter include acoustic signals, electrical signals, AM and FM waves, etc. As used in the appended claims, the term "computer-readable medium" denotes only tangible media that are readable by a computer unless otherwise specifically noted in the claim.

Figure 6:
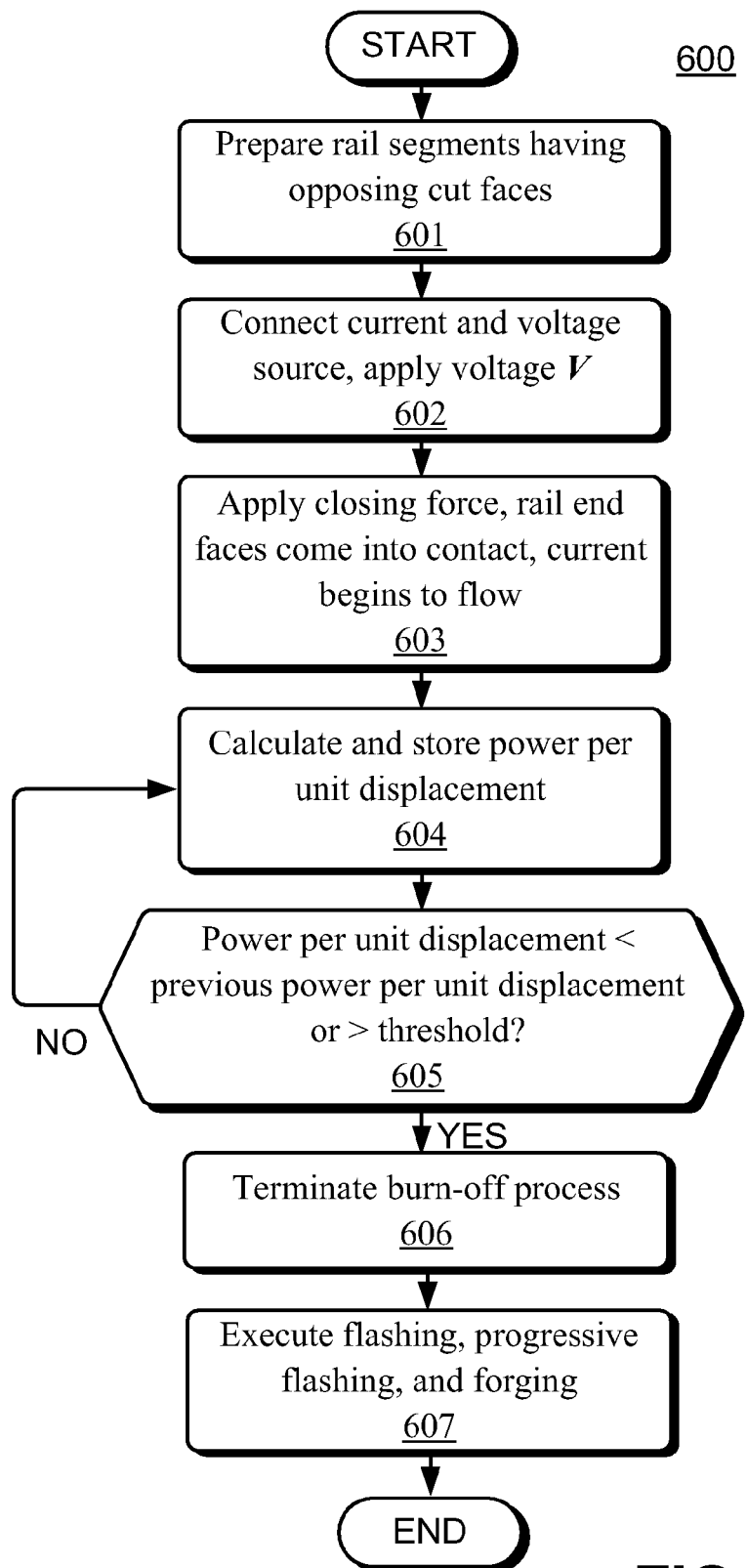
FIG. 6 is a flow chart illustrating a process of executing an in-track flash butt weld in accordance with the disclosed principles.

FIG. 6 shows a process 600 of executing a flash butt weld, including execution of an improved burn-off procedure, for a set of rail segments such as the first rail segment 300 and the second rail segment 301. At the first stage 601 of the process 600, an end of one or both of the first rail segment 300 and the second rail segment 301 is cut, to yield a set of rail segments having opposing cut faces, e.g., rail end face 305 and rail end face 306. This configuration is illustrated, for example, in FIG. 3. At stage 602, which may occur before or after stage 601, a current and voltage source is connected to both rail segments, so that there is a voltage difference V between the rail segments. In the case of DC voltage, the polarity of the imposed voltage difference will define the direction of the current when the rails touch, but neither the polarity of the voltage nor the direction of the current are of significance to the disclosed method. Moreover, the applied voltage may be AC or DC without affecting the applicability of the disclosed principles.

At stage 603 of the process 600, a closing force is applied to one or both of the rail segments such that the rail end faces come into contact and an electrical current begins to flow between the rail end faces. Because the rail end faces are not precisely flat and parallel, the initial contact area or patch between the rail end faces will be relatively small as a percentage of the overall rail cross-section. As such, the interface between the rails will be highly resistive initially, and the contact patch will experience dramatic resistive heating. When this occurs, the area of contact is burned away, the rail segments move toward each other, and the new contact patch is of a larger area than the initial contact patch. The new contact patch, being of greater area, is less resistive and allows a greater current to flow.

At stage 604, the closing force continues to be applied at some level (the force may be reduced when initial contact is made) as the rail segments move together. In this stage, a characteristic of the electrical current flow between the rail segment 300 and rail segment 301 is measured or derived. The detectable electrical quantities include voltage and current, as measured by the appropriate meters, while the detectable physical quantities include relative displacement of the rails. The quantities that may be derived from the measured quantities include electrical resistance or conductance, instantaneous electrical power, and electrical power as a function of time or displacement. Changes in certain quantities may be based on changes in all or some other quantities. For example, if voltage is maintained at a constant value, then changes in power can be detected via observations of changes in current. Similarly, if current is kept constant, any power changes will be detectable based solely on observed changes in voltage.

In an embodiment, the electrical characteristic of interest is the power consumed across the interface between rail segment 300 and rail segment 301 for a unit of rail displacement ("power per unit displacement," e.g., Watts/cm), which is calculated and recorded. The resulting rail configuration is illustrated, for example, in FIG. 4, with the burn-off approximately 50% complete. The time period over which the power is calculated should match the time period over which the displacement is measured. Thus, for example, if samples are taken at 500 ms intervals and the rails have closed by 5.0 mm between the prior sample and the current sample, consuming 200 Watts, then the power per unit displacement value will be 400 Watts/cm.

At stage 605, the sampled power per unit displacement is compared to the previously sampled power per unit displacement, if any, and to a predetermined power per unit displacement threshold. If the comparison indicates that the power per unit displacement is no longer increasing monotonically from sample to sample, or that the power per unit displacement has exceeded a predetermined power per unit displacement threshold, then the process 600 continues to stage 606, wherein the burn-off process is terminated. This configuration is illustrated, for example, in FIG. 5, with the burn-off completed and the rail ends in solid contact across the entire rail cross-section.

The predetermined power per unit displacement threshold is established based on the known power required to burn of a given volume of material. For example, if 100 Watts are required to burn off 1.0 mm$^3$ of material, and the cross-sectional area of the rail end is 75 cm$^2$, then the power per unit displacement measured to close the rails by 1.0 cm would be 750 kW. A lesser value indicates that the burn off is occurring over an area less than the entire rail end face.

From stage 606, the process 600 continues to stage 607, wherein the system executes flashing, progressive flashing, and forging procedures to finish the weld. If, on the other hand, the comparison at stage 605 indicates that the power per unit displacement is still increasing monotonically from sample to sample and that the power per unit displacement has not yet exceeded the predetermined power per unit displacement threshold, then the process returns to stage 604 to continue the burn-off of the rail end faces. Subsequently, once the conditions of stage 605 are met, the weld may be finished.

Depending upon the severity of the initial nonsquare condition, the interface 307 between the two rail segments at the conclusion of the burn-off may still be nonperpendicular in one or more dimensions relative to the rail axis 304. However, the rail end faces will now be flat and mutually parallel, allowing a strong weld to be made nonetheless. This condition is illustrated, in exaggerated form, in FIG. 5.

INDUSTRIAL APPLICABILITY

The present disclosure is applicable to systems for in-track welding of rail segments and provides an improved system wherein nonsquare rail end faces may be squared to one another prior to forging, without an excess or incomplete burn-off. As a result of this improvement, higher strength flash butt weld joints may be executed, while at the same time decreasing the need for user intervention during the weld process.

In particular, during an in-track welding process, after two rail end faces under an applied voltage differential are placed into contact, a current begins to flow. The current causes resistive heating and material removal at the point or points of contact. As this "burn-off" process proceeds, the power per unit displacement consumed at the interface is sampled and compared to a predetermined power per unit displacement threshold. The power per unit displacement is also compared to prior samples to determine if the power per unit displacement continues to increase.

If the power per unit displacement has stopped increasing or has risen past the predetermined threshold level, the burn-off process is complete. This is because a constant power per unit displacement correlates to a constant interface area, which indicates mutually square surfaces. The use of a threshold determination in addition to checking the increase in the power per unit displacement allows for minor variations in power per unit displacement from sample to sample that are due to impurities etc., rather than to a nonsquare condition.

It will be appreciated that the foregoing description provides examples of the disclosed system and process. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for performing a burn-off operation, in preparation for a flash butt weld operation to join a first rail segment to a second rail segment, where the first rail segment has a first rail end face and the second rail segment has a second rail end face, the first rail end face facing the second rail end face and being nonparallel with respect thereto, the method for performing the burn-off operation comprising:

applying a closing force to at least one of the first rail segment and the second rail segment such that the first rail end face and the second rail end face come into contact and causing an electrical current to flow between the first rail end face and the second rail end face, the electrical current flow being sufficient to cause a burn off of material at one or more points of contact between the first rail end face and the second rail end face;

testing, on a repeated basis, for a burn-off operation termination condition by:

obtaining a new value for a characteristic of the electrical current flow between the first rail segment and the second rail segment, first comparing the new value for the characteristic of the electrical current flow to a previously obtained value for the characteristic, and second comparing the new value for the characteristic of the electrical current flow to a predetermined threshold for terminating the burn-off operation;

continuing, based on the testing, the applying the closing force and causing the electrical current to flow only if:

the first comparing the new value for the characteristic to the previously obtained value for the characteristic indicates that a value of the sample for the characteristic of the electrical current flow is changing monotonically from sample to sample, and the second comparing the value of the sample for the characteristic to the predetermined threshold indicates that the value of the sample has not reached or passed a predetermined threshold; and otherwise, based on the testing, terminating the burn-off operation.

2. The method for performing a burn-off operation, in preparation for a flash butt weld according to claim 1, wherein obtaining a sample value for a characteristic of the electrical current flow between the first rail segment and the second rail segment includes measuring one or more of voltage, current, and relative rail displacement from which a value corresponding to power per unit length can be computed.

3. The method for performing a burn-off operation, in preparation for a flash butt weld according to claim 1, wherein the characteristic of the electrical current flow between the first rail segment and the second rail segment includes the power consumed per unit length of rail displacement.

4. The method for performing a burn-off operation, in preparation for a flash butt weld according to claim 3, wherein the comparison indicates that the power consumed per unit length of rail displacement is changing monotonically from sample to sample if the comparison indicates that the power consumed per unit length of rail displacement has increased from sample to sample.

5. The method for performing a burn-off operation, in preparation for a flash butt weld according to claim 3, wherein the power consumed per unit length of rail displacement is deemed to have reached or passed the predetermined threshold if the comparison indicates that the power consumed per unit length of rail displacement exceeds the predetermined threshold.

6. The method for performing a burn-off operation, in preparation for a flash butt weld according to claim 1, wherein the testing on a repeated basis comprises detecting that the characteristic of the electrical current flow has reached or passed the predetermined threshold and terminating the burn-off operation regardless of whether the first comparing indicates that the characteristic of the electrical current flow is changing monotonically from sample to sample.

7. The method for performing a burn-off operation, in preparation for a flash butt weld according to claim 1, further comprising preparing, before the applying, an end of at least one of the first rail segment and the second rail segment by cutting one of the first rail segment and the second rail segment.

8. The method for performing a burn-off operation, in preparation for a flash butt weld according to claim 1, wherein causing an electrical current to flow between the first rail end face and the second rail end face comprises applying a DC voltage difference between the first rail end face and the second rail end face.

9. The method for performing a burn-off operation, in preparation for a flash butt weld according to claim 1, wherein causing an electrical current to flow between the first rail end face and the second rail end face comprises applying an AC voltage difference between the first rail end face and the second rail end face.

10. The method for performing a burn-off operation, in preparation for a flash butt weld according to claim 1, wherein the burn-off of material is a result of resistive heating.

* * * * *

UNITED STATES PATENT AND TRADEMARK OFFICE
CERTIFICATE OF CORRECTION

| | | |
|---|---|---|
| PATENT NO. | : 8,487,205 B2 | Page 1 of 1 |
| APPLICATION NO. | : 12/200575 | |
| DATED | : July 16, 2013 | |
| INVENTOR(S) | : Battisti et al. | |

It is certified that error appears in the above-identified patent and that said Letters Patent is hereby corrected as shown below:

IN THE CLAIMS:

Column 9, lines 32-33, in Claim 1, delete "value of the sample for the characteristic" and insert -- value of the characteristic --.

Signed and Sealed this
Eleventh Day of August, 2015

Michelle K. Lee
*Director of the United States Patent and Trademark Office*